R. T. WINN.
APPARATUS FOR GRINDING BLADES.
APPLICATION FILED MAY 11, 1910.
981,511. Patented Jan. 10, 1911.
3 SHEETS—SHEET 1.
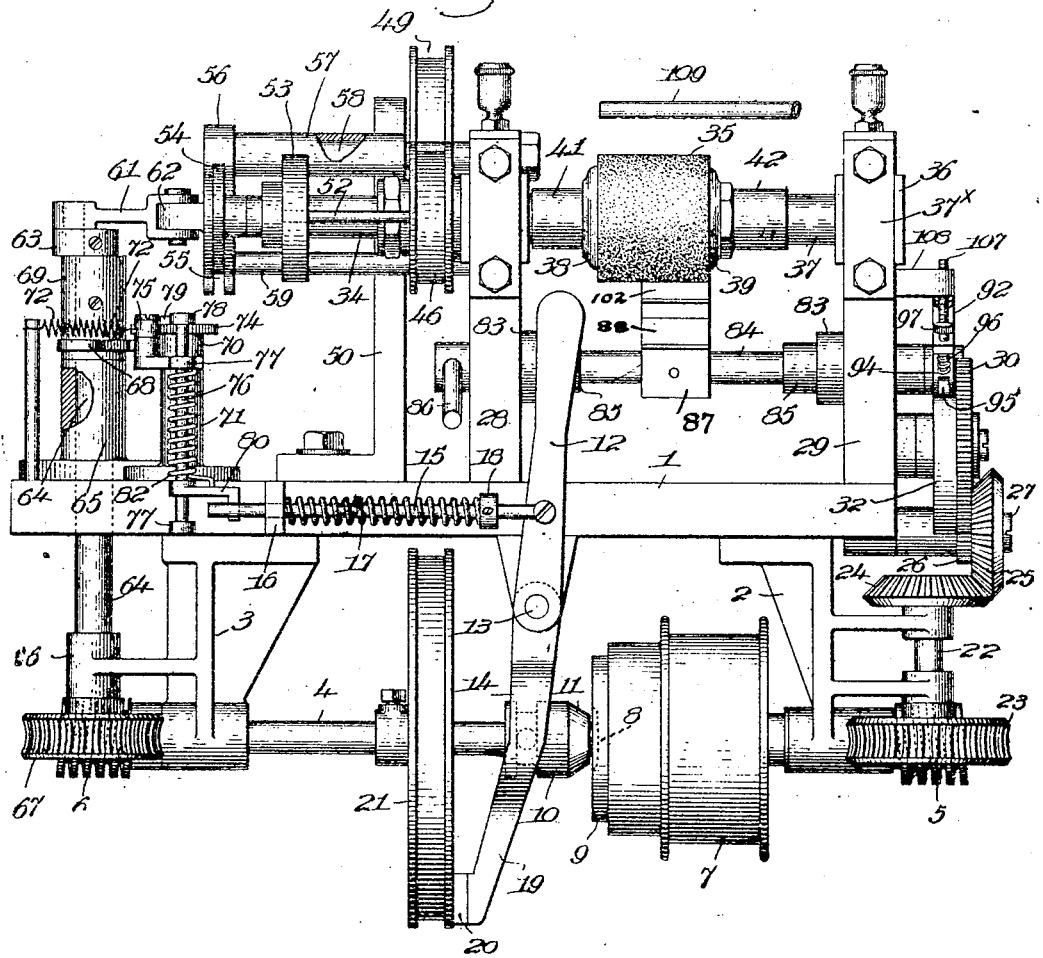

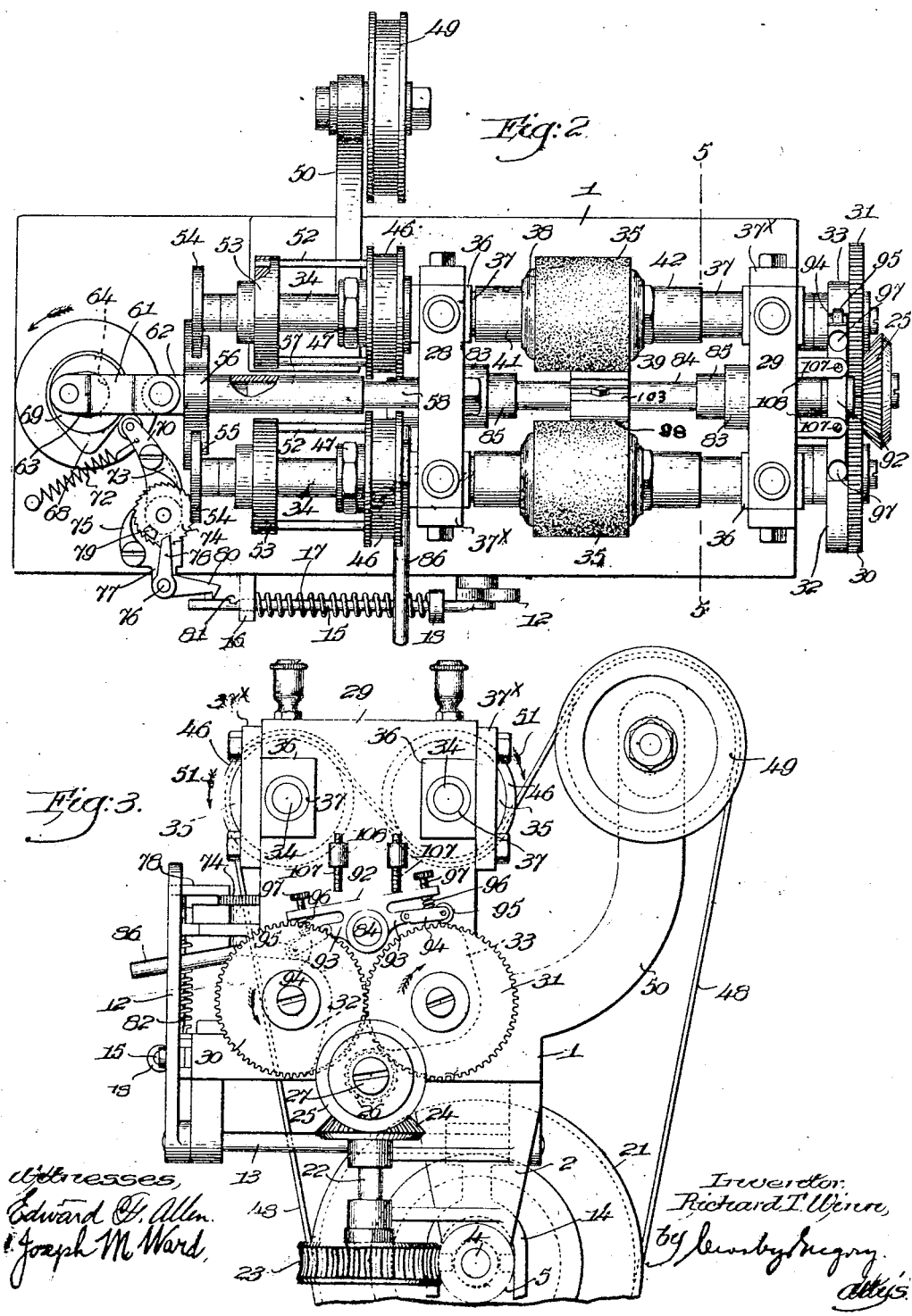

R. T. WINN.
APPARATUS FOR GRINDING BLADES.
APPLICATION FILED MAY 11, 1910.
981,511.
Patented Jan. 10, 1911.
3 SHEETS—SHEET 3.
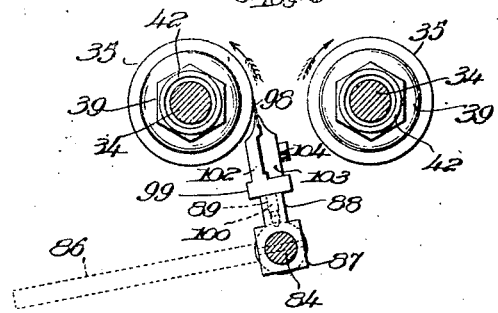
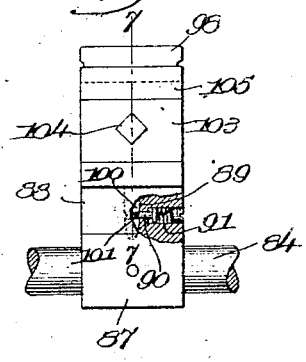
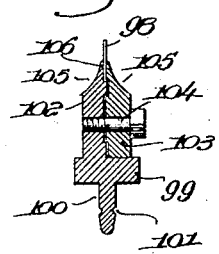
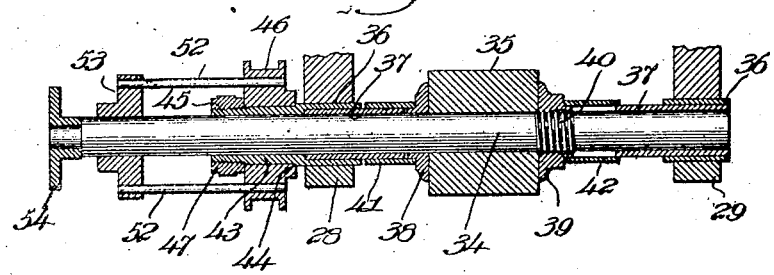
Witnesses,
Edward H. Allen
Joseph M. Ward.
Inventor:
Richard T. Winn
by Newby Gregory.
attys

UNITED STATES PATENT OFFICE.

RICHARD T. WINN, OF CLIFTONDALE, MASSACHUSETTS, ASSIGNOR TO LESLIE MANUFACTURING COMPANY, OF BOSTON, MASSACHUSETTS, A CORPORATION OF MAINE.

APPARATUS FOR GRINDING BLADES.

981,511. Specification of Letters Patent. Patented Jan. 10, 1911.

Application filed May 11, 1910. Serial No. 560,585.

*To all whom it may concern:*

Be it known that I, RICHARD T. WINN, a citizen of the United States, and resident of Cliftondale, county of Essex, State of Massachusetts, have invented an Improvement in Apparatus for Grinding Blades, of which the following description, in connection with the accompanying drawing, is a specification, like characters on the drawing representing like parts.

This invention has for its object the production of improved apparatus for grinding blades in a rapid, accurate and efficient manner.

My invention is particularly adapted for grinding safety-razor blades, which blades are made of thin plate metal and require grinding on opposite sides to produce the requisite edge.

In the present embodiment of my invention the blade to be ground is clamped in a self-centering blade-holder which is oscillated or rocked between two oppositely rotating and axially reciprocated grinders, to thereby present one side of the blade to be acted upon by one grinder, and then the holder is rocked to present the opposite side of said blade to be acted upon by the other grinder.

By making the holder self-centering the blade positions itself upon the grinder so as to contact therewith from one to the other end of the blade, provided the surface of the grinder be true, but also permitting the blade to adapt itself to the grinding surface for proper action in case such surface should be slightly irregular. The axial movement of the grinders causes them to act upon the blade from end to end, and a very perfect grinding is achieved.

These and other novel features of my invention will be fully described in the subjoined specification and particularly pointed out in the following claims.

Figure 1 is a front elevation of a grinding apparatus embodying one form of my present invention, the movable parts being at rest, and I have omitted the driving belt for the main shaft and also the transmitting belt between said shaft and the grinder shafts; Fig. 2 is a top plan view of the apparatus illustrated in Fig. 1, the pipes for supplying oil or water to the grinders being omitted, and also the belt for rotating the grinder shafts; Fig. 3 is a right-hand end elevation of the apparatus, viewing Figs. 1 and 2, and showing the transmitting belt between the grinder shafts and the main shaft; Fig. 4 is a left hand end elevation of the reciprocating head by means of which the grinder shafts are reciprocated axially and in unison; Fig. 5 is a transverse sectional detail on the line 5—5, Fig. 1, looking toward the left, showing the bladeholder and its carrier and the relation thereof to the grinders; Fig. 6 is an enlarged detail in rear elevation and part section of the blade-holder and carrier; Fig. 7 is a sectional view of the blade-holder on the line 7—7, Fig. 6; Fig. 8 is a perspective view of a blade adapted to be ground by the apparatus embodying my invention; Fig. 9 is a view of one of the grinder shafts with its adjuncts shown in longitudinal section, to illustrate clearly the construction of various details to be referred to hereinafter.

The working parts of the apparatus are supported upon a suitable base 1 provided with depending hangers 2, 3, Fig. 1, which provide suitable bearings for a main shaft 4 provided at its opposite ends with worms 5, 6 and having loosely mounted upon it a pulley 7 adapted to be driven by a belt, (not shown) from any suitable source of power. The inner end of the pulley is recessed at 8 and forms one member 9 of a friction clutch, the other member being shown as an annularly grooved collar 10 coned at 11 to enter and frictionally engage the recess 8 when the clutch is operative, said collar in practice being rotatable with and slidable on the main shaft 4, in well known manner. A shipper 12 is fixed on a transverse shaft 13 mounted in ears depending from the base, the shaft having fixedly secured to it a yoke 14 coöperating with the clutch-member 10 to open or close the clutch, the shipper having pivotally connected with it a rod 15 slidable in an ear 16 on the base, a spring 17 coiled around said rod between the ear and a collar 18 fast on the rod acting, when free to expand, to swing the shipper to open the clutch.

In Figs. 1 and 2 the shipper is shown in stopping position, and in order that the main shaft may be stopped promptly when the clutch is opened I have provided the yoke 14 with a depending brake-arm 19 having a friction pad or shoe 20 which is pressed against the side of a grooved disk pulley 21 fast on the shaft. When the shipper 12 is swung to the left, Fig. 1, to running position, the clutch is closed and simultaneously the brake-shoe 20 is retracted from engagement with said pulley 21, so that the main shaft is free to be rotated. Bracket 2 sustains a short intermediate shaft 22 having fast on its lower end a worm-gear 23 meshing with worm 5, and on the upper end of the intermediate shaft is fixed a bevel gear 24 meshing with and driving a like gear 25 having an attached pinion 26, both rotatable on a horizontal stud 27 carried by the base 1 at the right-hand end thereof, Figs. 1 and 2.
Transverse, upright stands 28, 29 are erected on the base, the former about the middle and the latter at the right-hand end thereof and two large and like meshing gears 30, 31, Fig. 3, are rotatably mounted on suitable studs extended outward from the stand 29, the gear 31 meshing with and being driven by the pinion 26. Like cams 32, 33 are secured to or form a part of the said gears 30, 31 at their inner sides, each cam as shown by dotted lines Fig. 3 having a long circular high part which in practice constitutes a dwell, with a quick rise to and fall from such part.

As shown in Fig. 3 the two cams are set so that the high part of one will not begin to act until the high part of the other cam ceases to act, as will be explained more clearly hereinafter, the arrows indicating the direction of rotation of the cams and their connected gears. Herein I have provided two rotatable, longitudinally movable and parallel shafts 34, 34, on each of which a grinder 35 is fixedly mounted, and inasmuch as the shafts and grinders are alike a detailed description of one will suffice for both. Said shafts are supported horizontally in bearings shown as boxes 36 set into recesses in the stands 28, 29 and held in place by cover-plates 37ˣ, each box having a cylindrical bore in which is fixed a guard sleeve 37 in which the shaft rotates and is movable longitudinally, each of said sleeves extending along the shaft toward the grinder 35, see Fig. 9, said grinders being of any suitable construction and material and cylindrical, and of greater length than the blades to be ground. A disk 38 fast on each shaft serves as an end stop for the grinder, and at its opposite end a clamping nut 39 is set up tightly on a threaded part 40 of the shaft, to secure the grinder fixedly upon its shaft. Oppositely extended sleeves 41, 42 are secured to the stop 38 and nut 39 respectively, and they telescopically embrace the fixed guard sleeves 37, so that as the shaft 34 is reciprocated longitudinally the two pairs of telescoping guard sleeves will effectually prevent the entrance of grit or dirt to the shaft bearings. Practically, the sleeves 37 form parts of the bearing boxes and sustain the shafts, as will be clear from Fig. 9.

In Fig. 9 the shaft is at the extreme left hand end of its stroke, the guard sleeve 41 closely approaching the box 36 at the left, and the outer end of the guard sleeve 42 overlaps by a safe margin the end of the fixed sleeve 37 at the right. During the grinding operation particles of grit, steel and dirt are given off freely, and were it not for the provision made for protecting the bearings of the shafts they would be rapidly cut and worn out. The boxes 36 mounted in the stand 28 are provided with cylindrical extensions 43, annularly shouldered at 44, Fig. 9, and threaded at 45, and upon each extension is mounted rotatably a grooved pulley 46, held thereon by a nut 47 screwed onto the part 45. The two pulleys 46 are opposite each other and above the large pulley 21 on the main shaft 4, and an endless transmitting belt 48 passes around pulley 21 up over a tension pulley 49 adjustably mounted on an arm 50 erected on the base 1, said belt passing thence to and under the rear one of the smaller pulleys 46 and up around and over the front pulley 46 and back to the driving pulley 21, as shown in Fig. 3. By this connection the pulleys 46 are rotated at high speed from the main shaft 4, and in opposite directions, as shown by the arrows 51, Fig. 3, the adjacent surfaces of the grinders traveling upward and outward, away from each other.

The transmitting connection heretofore 1( described between the main shaft 4 and the cams 32, 33 is positive and reduces the speed of the cams with relation to the main shaft, while the friction transmission between said shaft and the grinder shafts increases the 1( speed of rotation of the latter very greatly over that of the main shaft, as will be obvious. Each pulley 46 has fixedly attached to it a plurality of axially extended rods 52 which slide in holes in a disk 53 fast on 1 the grinder shaft 34 near its left-hand end, to effect rotation of the shaft while permitting longitudinal or axial reciprocation thereof in its fixed bearings. A second disk 54 fast on the end of each shaft 34 is ar- 1 ranged to rotate freely in a slot 55 in a reciprocating head 56, Figs. 1, 2 and 4, having an attached sleeve 57 slidably mounted on a horizontal guide-rod 58 extended outward from the standard 28, and below and 1 parallel to said rod is a second guide-rod 59 which is loosely embraced by a slotted ear 60 on said head, Fig. 4. Said head thus connects the two grinder shafts and effects axial reciprocation thereof in unison by 1 mechanism connecting the head and the main shaft 4, now to be described.

A link 61 is pivotally connected at one end to an ear 62 on the head 56, and at its other end pivotally engages a crank 63 on the upper end of a vertical counter-shaft 64 rotatable in a sleeve bearing 65 on the base, and in a second bearing 66 on bracket 3, a worm-gear 67 on the lower end of said shaft meshing with and being driven at a slow speed by the worm 6 on the main shaft 4, Fig. 1. As shaft 64 is slowly revolved the link 61 acts to reciprocate the head 56 and the grinder shafts, so that the two rotating grinders 35 are reciprocated axially at a slow speed, said grinders being shown at the extreme left hand end of their stroke in Figs. 1 and 2. At the top of the bearing 65 a cam 68 is fixed on shaft 64 by means of a long hub 69, said cam coöperating with the tail of a pawl-carrier 70 fulcrumed on an upright post 71 on the base and held against the cam by a spring 72, only partly shown in Fig. 1 to avoid confusion. An ordinary spring-pawl 73 on the pawl-carrier coöperates with a ratchet 74 rotatable on said post above the pawl-carrier, and held from retrograde rotation by a detent-pawl 75, clearly shown in Fig. 2.

A vertical spindle 76, Fig. 1, is sustained in suitable bearings 77, and carries at its upper end a trip finger 78 projecting across the top of the ratchet in the path of a lug 79 thereon, and near its lower end said spindle has fixed upon it a latch 80, adapted to engage a holding notch 81, Fig. 2, in the rod 15 connected with the shipper 12. The latch is pressed against the said rod by a spring 82 coiled around spindle 76 and fixed at its upper end to the bearing 77, the free lower end of the spring bearing against the latch. Every revolution of cam 68 causes the pawl 73 to turn the ratchet 74 one step forward, and one complete revolution of the ratchet will cause the lug 79 to engage the trip finger 78 and turn the spindle 76 to withdraw the latch 80 from the holding notch 81, thereby releasing the shipper 12 and permitting the spring 17 to operate and move the shipper to stopping position, shown in the drawings. Thus the apparatus is stopped automatically after a predetermined number of reciprocations of the grinders 35 has been effected, such number being sufficient to provide a proper grinding of a blade. This form of automatic stop-motion is simple, convenient and efficient, but any other suitable form of stop-motion may be utilized without departing from my invention.

The means for holding the blade to be ground, and for presenting opposite sides thereof to the grinders, in alternation, will now be described. The standards 28, 29 are herein shown as provided with opposite bearings 83, 83 for a shaft 84 forming part of a rocking carrier, said shaft being held from longitudinal movement by suitable collars 85 and projecting at its ends beyond the standards, the inner end having attached to it a handle 86 by which the carrier may be turned manually to neutral position. Said shaft 84 has fixedly secured to it between the collars 85 a block 87 provided with an upturned rectangular part 88 provided with a hole or seat 89, Figs. 5 and 6, radial to the shaft 84, a spring-plunger 90, Fig. 6, being mounted in a socket 91 in the side of the portion 88 of the block and projecting laterally into the seat 89. Said shaft and the attached block constitute what I have termed a rocking or oscillating carrier for a detachable blade-holder, the carrier being located below and between the grinder shafts 34, as herein shown, the shaft 84 being parallel thereto. The projecting end of the carrier-shaft 84 beyond the standard 29 has fast upon it a transverse yoke 92, Fig. 3, having ears 93 at opposite sides of the shaft, on which ears are pivoted short arms 94 provided at their outer end with follower-rolls 95 which coöperate with the two cams 32, 33, hereinbefore described, coiled springs 96 adjustably held by screw-studs 97 on the yoke acting upon the arms and yieldingly pressing the rolls 95 against the cams.

From an inspection of Fig. 3 it will be manifest that when a high part of either cam acts upon one of the rolls 95 that end of the yoke 92 will be raised and the carrier will be rocked in the opposite direction, the springs 96 being strong enough to provide for the rocking of the carrier but yielding when resistance to the rocking movement is encountered. As shown in Fig. 3 the cam 33 is acting to rock the carrier, so that the blade mounted thereon will be swung to the left and presented to the action of the left-hand grinder 35, while the cam 32 will not effect the reverse swing of the carrier until the high part of cam 33 leaves the coöperating roll 95. Thus the carrier is rocked or oscillated intermittingly, the long high or dwell portion of each cam insuring a period of rest after each swing of the carrier, and herein this rest period is long enough for the grinders to make one complete axial reciprocation. That is, referring to Fig. 2 the grinders will move to the right and then back again to the position shown before the cam 33 will permit the quick reverse swing of the carrier as the cam 32 acts to move its follower-roll 95 along the quick rise to the long circular portion of its surface.

My present apparatus is arranged to grind blades used in safety-razors, such a blade before it is ground being shown in perspective at 98, Fig. 8, and in practice these blades are cut or stamped out of thin sheet steel and suitably hardened. To be ground the blade is placed in a blade-holder herein shown as comprising a flat, rectangular base 99 having a centrally located and depending stem 100 annularly grooved at 101, the base having an upright portion 102 forming one member of a clamp, the other member 103 being connected therewith by a clamping bolt 104.

As shown in Figs. 5 and 7 the upper ends of the clamping members are concaved, at 105, adjacent the blade-engaging portion, the fixed member 102 having its inner face cut out to form a blade-seat 106 extended from end to end of the said member. The clamp-screw 104 is loosened, a blade is slipped in between the tapered ends 105 of the clamp members and seated on the blade-seat 106, and the screw 104 is then set up, the blade being thereby firmly and securely clamped and positioned in the blade-holder, with the portions of the blade to be ground projecting well beyond the holder. Now the latter is connected with the carrier by inserting the stem 100 in the radial seat 89, the tapered end of the stem passing by and pushing out the plunger 90 until it is free to snap or spring into the annular groove 101 in the stem, as shown in Fig. 6. A quick-acting detachable coupling or connection between the blade-holder and the rocking carrier is thus provided, the holder being retained on the carrier to move bodily with it, but at the same time the holder is free to turn on the stem 100 as an axis. I thus make the blade-holder self-centering so that it can adjust itself to the grinding surface when the blade is presented thereto by the rocking of the carrier, previously described.

The holder, when mounted on the carrier, is located between the grinders, and the blade is applied tangentially to the surface of either grinder, as will be manifest from an inspection of Fig. 5, along a line just above the horizontal plane intersecting the axes of rotation of the grinders. The throw of the carrier-rocking cams is such that when the blade is brought against a grinder it will be pressed yieldingly thereon owing to the compression of the then active one of the springs 96, and owing to the self-centering feature of the blade-holder the blade adapts itself automatically to the grinding surface as the rotating grinder is moved longitudinally along the blade.

While the apparatus is in operation the blade will be presented automatically to one and then to the other of the grinders to effect the grinding of the opposite sides of the blade in alternation, the curvature of the grinders giving the desired concavity to the cutting edge of the blade, both sides of which will be ground alike. A positive limitation of the oscillatory movement of the carrier and blade-holder is provided by the stop-screws 107 carried by ears 108 on the standard 29 and arranged to coöperate with the yoke 92 at opposite sides of the shaft 84 of the carrier. Each screw when adjusted determines just how far the blade in the holder can be moved toward the axis of a grinder, and if it is desired to grind one side of the blade more than the other side, or if one of the grinders has worn more rapidly than the other, the proper adjustment of the stop-screws provides for either case.

In practice a number of blade-holders will be used with each grinding apparatus, so that the attendant can take out the holder with the ground blade, insert another holder having a blade to be ground, and start the machine, and during the grinding operation he will remove the ground blade and put an unground one in the holder.

Any suitable means can be provided for supplying the grinders with oil, water, or other liquid during the grinding operation, and in Figs. 1 and 5 I have shown the delivery ends of pipes 109 designed for such purpose.

Various changes or modifications in different details of construction and arrangement may be made by those skilled in the art without departing from the spirit and scope of my invention as set forth in the claims annexed hereto.

Having fully described my invention, what I claim as new and desire to secure by Letters Patent is:—

1. The combination, with two oppositely rotating and longitudinally-movable parallel shafts, a grinder fast on each, and means to rec ocate the shafts positively and in unison, of a rocking carrier, a self-centering blade-holder between the grinders and mounted on said carrier, and means to intermittingly rock the latter and thereby present a blade in said holder to one and then to the other of the grinders, to grind opposite sides of the blade in alternation.

2. The combination, with two oppositely rotating and longitudinally-movable parallel shafts, a grinder fast on each, and means to reciprocate the shafts positively and in unison, of a rocking-carrier, a blade-holder, a detachable and self-centering connection between it and the carrier, and means to intermittingly rock the carrier and thereby present a blade in the holder to one and then to the other of the grinders and grind opposite sides of the blade in alternation.

3. The combination, with two oppositely rotating and longitudinally-movable parallel shafts, a grinder fast on each, and means to reciprocate the shafts positively and in unison, of a self-centering blade-holder located between the grinders, and intermittingly acting means to rock said blade-holder and yieldingly press a blade therein against one and then the other of the grinders, to grind opposite sides of the blade in alternation.

4. The combination, with two oppositely rotating and longitudinally-movable parallel shafts, a grinder fast on each, and means to reciprocate the shafts positively and in unison, of a self-centering blade-holder located between the grinders, and intermittingly acting means to rock the blade-holder and present a blade therein to one of said grinders during a complete axial reciprocation thereof and then to similarly present the blade to the other grinder.

5. The combination, with two oppositely rotating and longitudinally-movable parallel shafts, a grinder fast on each, and means to reciprocate the shafts positively and in unison, of a self-centering blade-holder located between the grinders, and intermittingly acting means, including oppositely rotating cams and coöperating, spring-controlled followers, to rock said blade-holder and yieldingly press a blade therein against one and then the other of the grinders, to grind opposite sides of the blade in alternation.

6. The combination, with two oppositely rotating and longitudinally-movable parallel shafts, a grinder fast on each, and means to reciprocate the shafts positively and in unison, of a rocking carrier fulcrumed below and parallel to said shafts, a yoke fast on the carrier, spring-controlled followers on said yoke at opposite sides of the carrier axis, and two oppositely rotating cams having high portions to coöperate in succession with the followers, to intermittingly rock the carrier, a blade-holder mounted on the carrier and adapted to oscillate between the grinders, to present a blade to one and then the other of said grinders and press it yieldingly against the grinding surface.

7. The combination, with two oppositely rotating and longitudinally-movable parallel shafts, a cylindrical grinder fast on each and of greater length than the blade to be ground, and means to reciprocate the shafts positively and in unison, of a self-centering blade-holder located between the grinders, and automatic means to rock the blade-holder and yieldingly press a blade therein against one and then the other of the grinders, the blade being subjected to the action of a grinder during a complete axial reciprocation thereof.

8. The combination, with two oppositely rotating and longitudinally-movable parallel shafts, a cylindrical grinder fast on each and of greater length than the blade to be ground, and means to reciprocate the shafts positively and in unison, of a rocking carrier, a holder to clamp a blade therein, a detachable, self-centering connection between said holder and carrier, to sustain the holder between the grinders, oppositely rotating cams, and yielding connections between said cams and the carrier, to rock the latter and the holder intermittingly and yieldingly press a blade in the holder against first one and then the other of the grinders as the latter are reciprocated axially.

9. The combination, with two oppositely rotating and longitudinally-movable parallel shafts, a grinder fast on each, and means to reciprocate the shafts positively and in unison, of a rocking carrier having a radial seat, a blade-holder having a stem to enter said seat, means to retain the stem in said seat while permitting rotative movement of the stem, and means to rock the carrier intermittingly and thereby present a blade in the holder to one and then the other of the grinders, rotative movement of the stem of the holder in its seat permitting the blade to adjust itself upon the grinder.

10. The combination, with two oppositely rotating and longitudinally-movable parallel shafts, a grinder fast on each, and means to reciprocate the shafts positively and in unison, of a rocking carrier having a radial seat, a blade-holder having an annularly grooved stem to enter the seat, a spring-plunger on the carrier to enter said groove and retain the stem in the seat while permitting rotative movement of the stem therein, and means to rock said carrier intermittingly and thereby present a blade in the holder to one and then the other of the grinders, the connection between the carrier and blade-holder permitting the latter to center itself with relation to a grinder.

11. The combination, with two oppositely rotating and longitudinally-movable parallel shafts, a grinder fast on each, and means to reciprocate the shafts positively and in unison, of a rocking carrier, a blade-holder having a seat for the blade and a retaining clamp, a detachable, self-centering connection between the blade-holder and carrier, and intermittingly acting means to rock the carrier and oscillate the blade-holder between the grinders, to present a blade in said holder to the action of first one and then the other of the grinders.

12. The combination, with two oppositely rotating and longitudinally-movable parallel shafts, a grinder fast on each, and means to reciprocate the shafts positively and in unison, of a rocking carrier, a self-centering blade-holder between the grinders and mounted on said carrier, yieldingly mounted followers on the carrier at opposite sides of its axis, two oppositely rotating cams to coöperate successively with the followers and thereby rock the carrier and blade-holder, to press a blade in said holder yieldingly against one grinder and then against the other grinder, whereby opposite sides of the blade are ground in alternation.

13. In apparatus of the class described, a grinder shaft, fixed bearings in which it is movable, rotatably and longitudinally, a grinder fast on the shaft between said bearings, and telescoping guards mounted on said bearings and the shaft, respectively, and surrounding the latter to protect the bearings from grit.

14. In apparatus of the class described, a grinder shaft, fixed bearings in which it is movable rotatably and longitudinally, a fixed guard sleeve surrounding the shaft and extended inward from each bearing, a grinder fast on the shaft between the bearings, and guard sleeves fixed on and surrounding the shaft and extended oppositely from the grinder in telescopic engagement with the fixed sleeves, to prevent the entrance of grit to the bearings.

15. In apparatus of the class described, a grinder shaft, fixed bearings in which it is movable rotatably and longitudinally, a grinder fast on the shaft between said bearings and tubular, telescopic guards surrounding the shaft between the grinder and said bearings, to permit longitudinal movement of the shaft while protecting it and the bearings from the entrance of dirt or grit.

16. In apparatus of the class described, a grinder shaft, fixed bearings in which it is movable rotatably and longitudinally, and tubular, telescopic guards surrounding the shaft between the grinder and said bearings, to permit longitudinal movement of the shaft while protecting it and the bearings from the entrance of dirt or grit, combined with a driving pulley loosely surrounding said shaft outside one of the bearings, axially extended pins fixed on the pulley, a disk fast on the shaft and apertured to slidably engage said pins, whereby rotative movement of the pulley is transmitted to the shaft, and means to effect longitudinal movement of the shaft with respect to the bearings and said driving pulley.

17. In apparatus of the class described, two oppositely rotatable and longitudinally reciprocating, parallel shafts, a grinder fast on each, a blade-holder between the grinders, intermittingly acting means to rock said holder to present a blade therein to one and then the other of the grinders, a main shaft, a high-speed transmitting connection between it and the grinder shafts, to rotate them, and a separate, low-speed transmitting connection between the said main shaft and the means for rocking the blade-holder.

18. In apparatus of the class described, two oppositely rotatable and longitudinally movable, parallel shafts, a grinder fast on each, an oscillating, self-centering blade-holder between the grinders, means to rock said holder intermittingly and thereby present a blade therein to one and then the other of the grinders, a main shaft, independent transmitting connections between it and the blade-holder rocking means, and means actuated by the main shaft and operatively connected with the grinder shafts to effect longitudinal reciprocation thereof in unison.

19. In apparatus of the class described, two oppositely rotatable and longitudinally reciprocating, parallel shafts, a grinder fast on each, a blade-holder between the grinders, intermittingly acting means to rock said holder to present a blade therein to one and then the other of the grinders, a main shaft, a belt transmission between it and the grinder shafts, to rotate them at high speed, a speed-reducing train of gearing between the main shaft and the means for rocking the blade-holder to actuate said means, a driving pulley loose on the main shaft, a clutch to operatively connect said shaft and pulley, and a brake for the main shaft, rendered operative by release of the clutch.

20. In apparatus of the class described, two oppositely rotatable and longitudinally reciprocating, parallel shafts, a grinder fast on each, a blade-holder between the grinders, intermittingly acting means to rock said holder to present a blade therein to one and then the other of the grinders, a main shaft, a high-speed transmitting connection between it and the grinder shafts, to effect rotation thereof, and a separate transmitting connection between the means for rocking the blade-holder and the main shaft, combined with means actuated by the main shaft to effect axial reciprocation of the grinder shafts in unison, and mechanism to stop rotation of the main shaft automatically when a predetermined number of reciprocations of the grinder shafts has been effected.

21. In apparatus of the class described, two oppositely rotatable and longitudinally reciprocating, parallel shafts, a grinder fast on each, a blade-holder between the grinders, intermittingly acting means to rock said holder to present a blade therein to one and then the other of the grinders, a main shaft, separate transmitting connections between the main shaft and said grinder shafts and the means for rocking the blade-holder, means driven by the main shaft to reciprocate the grinder shafts axially in unison, and mechanism to stop rotation of the main shaft automatically when a predetermined number of reciprocations of the grinder shafts has been effected.

22. In apparatus of the class described, two oppositely rotatable and longitudinally reciprocating, parallel shafts, a grinder fast on each, a blade-holder between the grinders, intermittingly acting means to rock said holder to present a blade therein to one and then the other of the grinders, a main shaft, separate transmitting connections between the main shaft and said grinder shafts and the means for rocking the blade-holder, means driven by the main shaft to reciprocate the grinder shafts axially in unison, a shipper to throw the power on and off said main shaft, a spring to move the shipper to stopping position, a latch to hold the shipper in running position, and means to retract said latch and thereby release the shipper when a predetermined number of reciprocations of the grinder shafts has been effected.

23. The combination, with two oppositely rotating and longitudinally-movable parallel shafts, a grinder fast on each, and means to reciprocate the shafts positively and in unison, of a self-centering blade-holder located between the grinders, means to rock the blade-holder intermittingly and yieldingly press a blade therein against one and then the other of the grinders, to grind opposite sides of the blade in alternation, and adjustable stops to limit the rocking movement of the blade-holder in either direction.

24. The combination, with two oppositely rotating and longitudinally-movable parallel shafts, a grinder fast on each, and means to reciprocate the shafts positively and in unison, of a rocking carrier, a self-centering blade-holder between the grinders and mounted on said carrier, opposite, radially extended followers yieldingly mounted on the carrier, means, including rotating cams coöperating with the followers, to rock the carrier and blade-holder and yieldingly press a blade therein against first one and then the other of said grinders, and independent, adjustable stops to positively limit rocking movement of the blade-holder.

25. The combination, with two oppositely rotating and longitudinally-movable parallel shafts, a grinder fast on each, and means to reciprocate the shafts positively and in unison, of a rocking carrier, a self-centering blade-holder between the grinders and mounted on said carrier; automatic means to rock the carrier and present a blade in the holder to one and then to the other of the grinders, and a handle connected with the carrier to position the blade-holder midway between the grinders.

26. In apparatus of the class described, two oppositely rotating and longitudinally-movable parallel shafts, a grinder fast on each, fixed guides between and parallel to said shafts, a transverse, slotted head slidably mounted on said guides, disks fast on the shafts and loosely entering the slotted portions of said head, and means to reciprocate said head on the guides, whereby through coöperation with said disks the head effects longitudinal reciprocation of the grinder shafts in unison.

In testimony whereof, I have signed my name to this specification, in the presence of two subscribing witnesses.

RICHARD T. WINN.

Witnesses:
JOHN C. EDWARDS,
FREDERICK S. GREENLEAF.